Patented Dec. 27, 1927.

1,654,224

UNITED STATES PATENT OFFICE.

CARL J. OECHSLIN, OF ABLON, FRANCE.

METHOD FOR PREPARATION OF ALIPHATIC DI- OR POLY-HYDROXY-ARSONIC ACIDS.

No Drawing. Original application filed September 14, 1922, Serial No. 588,182, and in France December 29, 1921. Divided and this application filed January 26, 1925. Serial No. 4,914.

As stated in my application Serial No. 588,182, filed September 14, 1922, of which the present application is a division, the best method of preparing methyl-ethyl-arsonic acids and the like consists in causing the alkyl-halogens to act upon sodium arsenite.

The discovery has been made that sodium arsenite can also be acted upon by aliphatic products containing in the same molecule one or more halogens and one or more hydroxyl groups. The present application is concerned with the di- and polyhalogenhydrins. For example, the dichlorohydrin of glycerol.

The proportions between the arsenious acid and the di- or polyhydrin, and between the caustic soda and the arsenious acid, can be varied within rather wide limits. The temperatures of the reaction may also be varied accordingly.

Example.

64.5 grams of glycerol dichlorohydrin are added to a solution of 100 grams of arsenious acid in 262 c. c. of 38% caustic soda solution and heated to 80 degrees C., the solution being stirred during the heating. About half an hour's time is required to complete the reaction. Upon acidulation, crystallization of a product

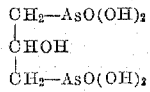

is obtained. This product is dissolved in the original reaction solution in the form of a salt. Upon acidification, hydroxypropyl-diarsenic acid is liberated and as it is insoluble in water, it crystallizes out of the solution.

Recrystallization with alcohol is then performed.

The residue is the product

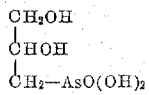

The above compound remains in the original reaction solution and crystallizes therefrom after the hydroxypropyl-diarsenic acid.

Having now particularly described and ascertained the nature of my invention, and in what manner the same is to be performed, I declare that what I claim is:

1. The method of preparing aliphatic hydroxyarsonic acids by the action of an alkali metal arsenite upon an aliphatic dihalogen-hydrin, and decomposing the resulting alkali metal salt with acid.

2. The method of preparing aliphatic hydroxy-arsonic acids by the action of an alkali metal arsenite upon an aliphatic polyhalogen-hydrin, and decomposing the resulting alkali metal salt with acid.

3. The method of preparing aliphatic hydroxy-arsonic acids by the action of an alkali metal arsenite upon an aliphatic polyhalogen-polyhydrin, and decomposing the resulting alkali metal salt with acid.

4. The method of preparing the hydroxy-arsonic acids represented by the formulæ:

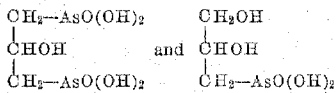

which consists in treating glycerol dichlorohydrin with arsenous acid in caustic soda solution, with heating and stirring, and subsequent isolation of the free acid by acidification, extraction with alcohol, and evaporation of the solvent.

CARL J. OECHSLIN.